US008325137B2

(12) United States Patent
Maroun

(10) Patent No.: US 8,325,137 B2
(45) Date of Patent: Dec. 4, 2012

(54) QUIET MOUSE

(76) Inventor: Maroun Gregory Maroun, Frankenmuth, MI (US)

(*) Notice: Subject to any disclaimer, the term of this patent is extended or adjusted under 35 U.S.C. 154(b) by 938 days.

(21) Appl. No.: 12/402,044

(22) Filed: Mar. 11, 2009

(65) Prior Publication Data

US 2010/0231516 A1   Sep. 16, 2010

(51) Int. Cl.
    *G09G 5/08*   (2006.01)
(52) U.S. Cl. .................... 345/163; 345/167
(58) Field of Classification Search .............. 345/156, 345/157, 161, 163–168
    See application file for complete search history.

(56) References Cited

U.S. PATENT DOCUMENTS

| | | | | |
|---|---|---|---|---|
| 4,154,726 A * | 5/1979 | Kajinami | ............ | 530/371 |
| 4,364,035 A * | 12/1982 | Kirsch | ............ | 345/166 |
| 4,390,873 A * | 6/1983 | Kirsch | ............ | 345/166 |
| 4,922,236 A * | 5/1990 | Heady | ............ | 345/166 |
| 4,939,324 A * | 7/1990 | English et al. | ............ | 200/345 |
| 5,298,918 A * | 3/1994 | Yen-Chen et al. | ............ | 345/163 |
| 5,710,397 A * | 1/1998 | Liao | ............ | 200/5 A |
| 5,959,810 A * | 9/1999 | Kakihara et al. | ............ | 360/324.12 |
| 6,195,082 B1 * | 2/2001 | May et al. | ............ | 345/161 |
| 7,161,584 B2 | 1/2007 | Maroun | | |
| 7,205,980 B2 | 4/2007 | Maroun | | |
| 2005/0062719 A1 * | 3/2005 | Hinckley et al. | ............ | 345/163 |

* cited by examiner

*Primary Examiner* — Ricardo L Osorio
(74) *Attorney, Agent, or Firm* — Carlson, Gaskey & Olds, PC

(57) ABSTRACT

A computer pointing device includes an interface for communicating to a computer in response to a user input. The pointing device includes a moveable input that is activated by the user. The pointing device includes at least one input electrical contact and at least one interface electrical contact. The moveable input cooperates with the resilient member to connect and disconnect the input electrical contact and the interface electrical contact from each other. The pointing device also includes a damper that is associated with at least one of the contacts to dampen noise generated by movement of the resilient member in response to user input.

20 Claims, 2 Drawing Sheets

QUIET MOUSE

BACKGROUND OF THE INVENTION

The present invention generally relates to a computer pointing device that translates the motion of a user's hand into signals interpreted by a computer, and more particularly to a computer pointing device that includes an inaudible moveable input activated by a user.

Pointing devices, such as a traditional "wheeled" mouse or an optical mouse for example, have two primary functions. The pointing device is used to translate the motion of the user's hand into signals that the computer can identify, which is typically referred to as "pointing." The pointing device is also used to send user selection criteria from the user to the computer, which is typically referred to as "clicking."

"Clicking" occurs when the user presses and releases an input on the top of the mouse. A small fixed protrusion on the internal face of the button actuates a spring which comprises an electrical contact. When a button is pressed, the spring electrical contact breaks the signal path. When the button is released, the spring electrical contact closes the signal path, indicating a user selection or relocating the cursor to the users newly chosen position.

Both the optical mouse and the traditional "wheeled" mouse have an audible "click" when the user actuates an input. This audible "click" can be objectionable to the user and/or to others in the near vicinity. This "click" can be especially objectionable, when the application the user is running requires multiple or successive user inputs, for example when the user is playing a computer game.

U.S. Pat. Nos. 7,161,584 and 7,205,980 invented and owned by the same inventor as this present invention, discloses a computer pointing device configuration that significantly reduces this "clicking" noise. However, there is a need to even further reduce noise generated by the clicking operation to provide an essentially quiet or silent mouse.

SUMMARY OF THE INVENTION

A computer pointing device utilizes a damper to eliminate clicking noises generated during user input to the device.

In one example, the computer pointing device includes a moveable input generating user input signals that are communicated to a computer. An interface communicates the user input from the movable input to the computer via at least one interface electrical contact. At least one resilient member is responsive to movement of the moveable input to electrically connect and disconnect at least one input electrical contact with the at least one interface electrical contact. A damper dampens noise generated by movement of the moveable input in response to user input. The damper is associated with at least one of the interface and input electrical contacts.

In one example, the damper includes a first damping mechanism associated with the at least one of the input and interface electrical contacts and a second damping mechanism that is positioned between the resilient member and the moveable input. In one configuration the first damping mechanism comprises a layer of dampening material that rests on the interface and input electrical contacts. The layer can be a single layer of dampening material or each contact can have an individual, separate layer of dampening material. In one example, the second damping mechanism comprises another layer of dampening material that is supported by an upper surface of the resilient member.

Associating the damper with the contacts significantly reduces noise generated during movement of the resilient member. These and other features of the present invention can be best understood from the following specification and drawings, the following of which is a brief description.

DETAILED DESCRIPTION OF THE PREFERRED EMBODIMENT

Figure 1:
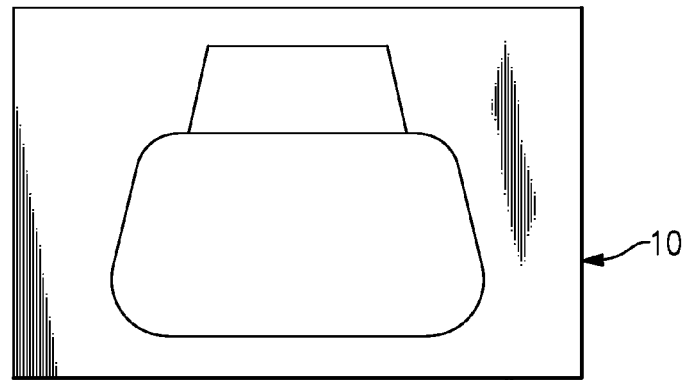
FIG. 1 illustrates a schematic view of a computer including a computer pointing device incorporating the present invention.

FIG. 1 illustrates a schematic view of a computer 10 with a computer pointing device 12 that includes an inaudible moveable input 14 that is in communication with the computer 10. In one disclosed embodiment, the computer pointing device 12 is a computer mouse and the moveable input 14 comprises a button, tab, or other similar structure. Further, it should be understood that actuation of the moveable input 14 is substantially noiseless, i.e., the moveable input and/or any other associated input components do not generate an audible "clicking" noise when actuated.

The computer pointing device can comprise a traditional "wheeled" mouse with a track ball mounted within a housing, an optical mouse, a wireless mouse, or any other type of computer pointing device. The computer pointing device 12 translates motion of a user's hand into signals that can be read by the computer 10. This hand motion and associated computer translation is referred to as "pointing." User tactile input to the moveable input sends user selection criteria from the user to the computer 10 and is referred to as "clicking."

U.S. Pat. Nos. 7,161,584 and 7,205,980 invented and owned by the same inventor as this present invention, discloses a computer pointing device configuration that significantly reduces this "clicking" noise. These patents are herein incorporated by reference.

Figure 2:
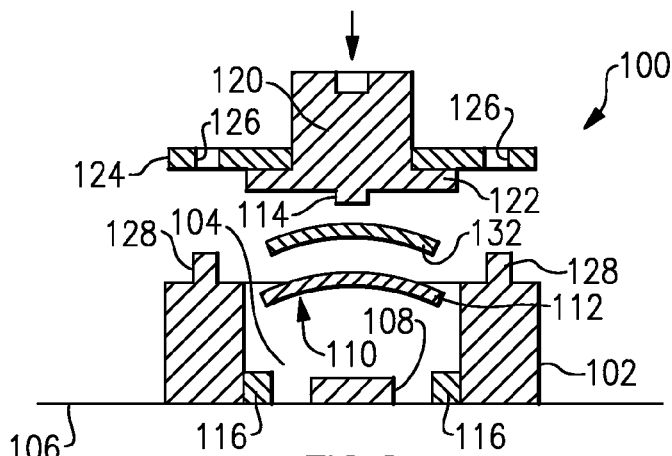
FIG. 2 illustrates an exploded view, shown in partial cross-section, of one example of an input for a computer pointing device with a damper.
Figure 3:
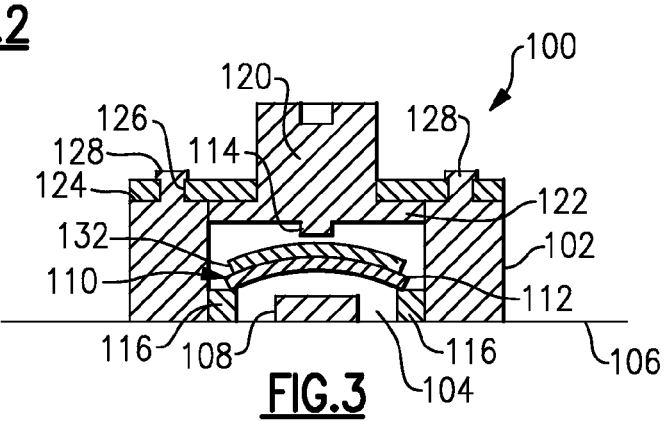
FIG. 3 illustrates an assembled view, shown in cross-section, of the input shown in FIG. 2.
Figure 4:
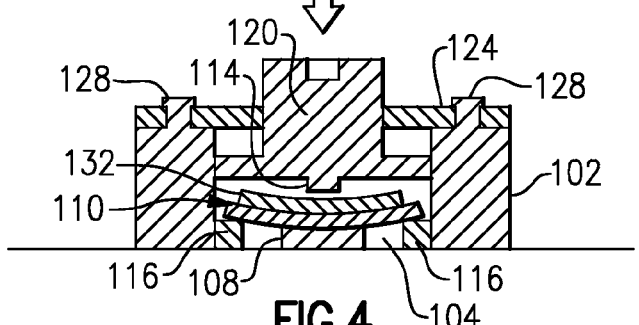
FIG. 4 is a view similar to FIG. 3 but showing the input in a depressed position.

FIGS. 2-4 show one example of an inaudible moveable input 100 that is incorporated into the computer pointing device 12. In this example, the inaudible moveable input 100 includes a lower housing 102 defining an internal cavity 104. The lower housing 102 is integrally formed with, or is separately attached to, a base 106. An interface electrical contact 108 is mounted to the base 106 within the internal cavity 104.

A resilient member 110 is positioned above the interface electrical contact 108. In one example, the resilient member 110 is a dome or disc-shaped member having a curved upper surface 112. The resilient member 110 can be made of metal, polyester, or any other suitable material. Further, the resilient member 110 can have many different shapes.

The resilient member 110 is depressed by a shaft portion 114 to electrically connect at least one input electrical contact 116, which is either part of the shaft portion 114 or is associated with the shaft portion 114, to the interface electrical contact 108. In the example shown, the at least one electric contact 116 comprises a pair of electrical contacts 116 that are positioned on opposing sides of the interface electrical contact 108 from each other. The shaft portion 114 is formed as part of an upper housing 120 that encloses the internal cavity 104. The shaft portion 114 comprises a protrusion that extends downwardly from the upper housing 120 toward the resilient member 110. Optionally, the shaft portion 114 could be separately attached to the upper housing 120.

The shaft portion 114 is actuated by a button 118 (see FIG. 5) or other similar mechanism on the computer pointing device 12 in response to user input. When a user presses downwardly on the button 118, the shaft 114 causes the resilient member 110 to deflect downwardly such that a center portion of the resilient member contacts the interface electrical contact 108. When the resilient member 110 contacts both the interface electrical contact 108 and the input electrical contact 116, a circuit is closed and information can be communicated from the computer pointing device 12 to the computer 10. When the user releases the button 118, the shaft portion 114 moves upwardly and the resilient member 110 returns to its original position of a non-contact relationship with the interface electrical contact 108 with only edges of the resilient member contacting the input electrical contacts 116.

In one example, the upper housing 120 includes a flange portion 122. A mount 124 includes a plurality of openings 126 that receive extensions 128 formed on the lower housing 102. The extensions 128 are heat staked to secure the upper 120 and lower 102 housings together and enclose the resilient member 110 within the internal cavity 104. While heat staking is shown, it should be understood that other attachment methods could also be used.

As discussed above, when the shaft portion 114 is in an inactivated state (FIG. 3), edges of the resilient member 110 rest on the electrical contacts 116. When the shaft portion 114 is depressed, the center of the resilient member 110 collapses, see FIG. 4, and makes contact between input and interface electrical contacts 116, 108 to close the circuit. When the shaft portion 114 depresses the resilient member 110, a popping, snapping, or clicking noise is generated. To eliminate or reduce this noise, the computer pointing device 12 includes a damper comprising a damping material 132.

In one example, the damping material is positioned above the resilient member 110. The damping material 132 is can mounted to, or supported on, the curved upper surface 112 of the resilient member 110; however, the damping material 132 could also be a separate piece from the resilient member 110. The damping material 132 can be duct tape, contact paper, or any other similar material that is capable of damping noise.

One example of a switchable computer pointing device 140 including the inaudible moveable input 100 described above is shown in FIG. 5. In this configuration, the computer pointing device 140 includes a pair of buttons 118. Under each button 118 there is one inaudible moveable input 100, and one audible movable input 142. The audible movable input 142 is similarly constructed as the inaudible movable input 100 except that the damping material 132 is removed.

One switching mechanism 144 is associated with each button 118. The switching mechanism 144 includes a tab 146 that extends outwardly from a computer pointing device base 148. An opening 150 is formed under each button 118 through which the tabs 146 extend. The switching mechanism 144 also includes a base 152 that supports the inaudible 100 and audible 142 moveable inputs.

The user moves each tab 146 back and forth within the opening 150 to move the base 152 relative to the computer pointing device base 148. This moves the inaudible 100 and audible 142 moveable inputs relative to the respective buttons 118. Each button 118 includes a protrusion 154 that will actuate the shaft portion 114 in the inaudible 100 or audible 142 moveable inputs. The base 152 slides relative to the protrusion 154 to place either the inaudible 100 or audible 142 moveable inputs depending on the desired mode of operation.

Figure 5:
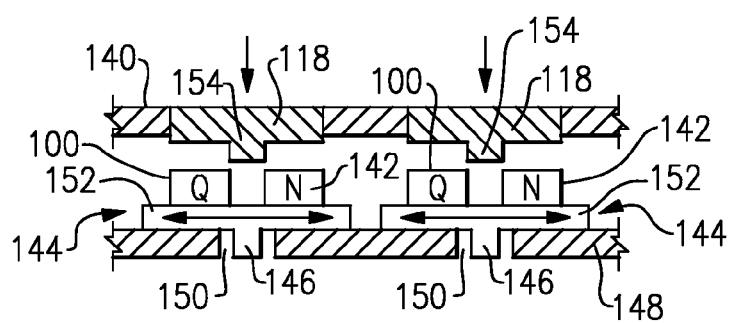
FIG. 5 schematically illustrates the computer pointing device of FIGS. 2 and 3 with a switching mechanism for switching between audible and inaudible operation.

It should be understood that the switching mechanism shown above is just one example of such a mechanism, and that other types of switches could be used to switch between a silent (inaudible) mode and an audible mode. Further, while two separate switching mechanisms are shown in FIG. 5, a single switching mechanism could also be used to allow both buttons 118 to be switched between audible and inaudible modes simultaneously. The switching mechanism could also be incorporated into other examples of computer pointing devices with a damping mechanism as discussed below.

Figure 6:
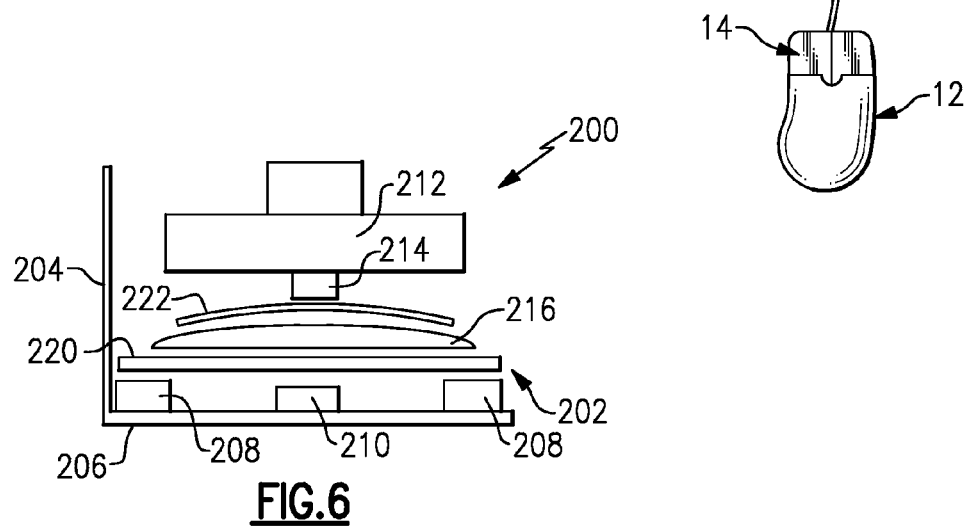
FIG. 6 schematically illustrates another example of a damper.

FIG. 6 shows another example of a computer pointing device 200 with a damping mechanism 202. A housing 204 includes a base 206 that supports input 208 and interface 210 electrical contacts as described above. The housing 204 can comprise a single piece component or can be made up of several housing portions that are attached to each other. An actuator 212 includes a shaft 214 as described above and is moveable in response to user input to a button 118 (FIG. 5).

A resilient member 216, which in the example shown comprises a dome-shaped member, is positioned below the shaft 214 and above the input 208 and interface 210 electrical contacts. In a traditional configuration, the resilient member 216 is collapsed or compressed by the shaft 214 such that a bottom center surface of the resilient member 216 hits the interface electrical contact 210. This contact between the resilient member 216 and the interface electrical contact 210 generates a certain amount of noise.

In order to reduce or eliminate this noise, the computer pointing device 200 includes the damping mechanism 202. In this example, the damping mechanism 202 includes a damper or layer of dampening material 220 that is positioned below the resilient member 216. This layer of dampening material 220 acts as a cushion to dampen noise generated by contact between the resilient member 216 and the input 208 and interface 210 electrical contacts.

In one example shown in FIG. 6, the layer of dampening material 220 comprises a single layer of material that rests on upper surfaces of the input 208 and interface 210 electrical contacts. The resilient member 216 then rests on an upper surface of the layer of dampening material 220.

The damping mechanism 202 could also be used in combination with another layer of dampening material 222, as described above, which is positioned between the upper surface of the resilient member 216 and the shaft 214. The dampening material 222 can be attached to, or separate from the resilient member 216. Further, as discussed above, the material used for the layers of dampening material 220, 222 can comprise any type of material that provides sufficient dampening characteristics.

In the example shown in FIG. 6, the lower layer of dampening material 220 is defined by a larger diameter than the upper layer of dampening material 222. This larger diameter for the lower layer is required such that the layer can contact the upper surfaces of both outwardly spaced input electrical contacts 210.

Figure 7:
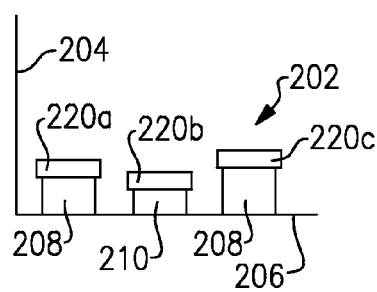
FIG. 7 schematically illustrates another example of a damper.

In the example shown in FIG. 7, instead of having a large single-piece layer of material, the layer of dampening material 220 is made up of a plurality of discrete separate layers of material 220a, 220b, 220c. In this example, each of the input 208 and interface 210 electrical contacts has its own layer of material. These separate layers of material 220a, 220b, 220c can rest on top of, or be directly attached to, the associated input 208 and interface 210 electrical contacts.

Figure 8:
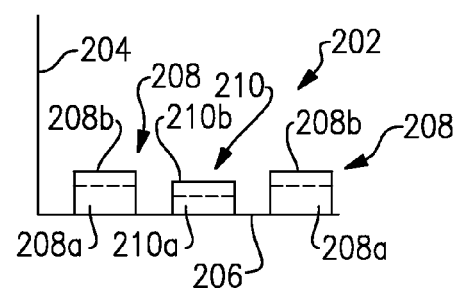
FIG. 8 schematically illustrates another example of a damper.

FIG. 8 shows another example of the damping mechanism 202 where the layer of dampening material 220 is integrally formed as part of the input 208 and interface 210 electrical contacts themselves. The input electrical contacts 208 are each configured as a single-piece component with a contact portion 208a and a damper portion 208b. The interface electrical contact 210 is similarly formed as a single-piece component with a contact portion 210a and a damper portion 210b. In this example, the material used to form these contacts could comprise a soft, non-metal material; however, other types of materials could also be used.

The use of a layer of dampening material below the resilient member significantly reduces noise generated by contact between the resilient member and the interface electrical contact. Further, when used in combination with another layer of dampening material above the resilient member, a damping mechanism is provided that essentially eliminates all noise generated during a "clicking" operation.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

The invention claimed is:

1. A computer pointing device comprising:
   an inaudible movable input;
   an interface for communicating user input from said inaudible movable input to a computer, said interface including at least one interface electrical contact;
   at least one input electrical contact electrically connectable to said at least one interface electrical contact in response to the user input;
   at least one resilient member moveable to electrically connect and disconnect said at least one input electrical contact with said at least one interface electrical contact;
   a damper associated with at least one of said interface electrical contact and said input electrical contact; and
   at least one moveable user input member cooperating with said resilient member to selectively engage and disengage said input electrical contact from said interface electrical contact wherein said damper dampens noise generated by movement of said resilient member in response to user input to said input member.

2. The device of claim 1 including an audible moveable input and a switching mechanism for moving said audible and inaudible moveable inputs relative to said moveable user input member.

3. The device of claim 1 wherein said moveable user input member comprises a button.

4. The device of claim 1 wherein said damper comprises at least a first layer of dampening material that is positioned between said at least one resilient member and said at least one interface electrical contact.

5. The device of claim 4 wherein said damper includes a second layer of dampening material positioned between said at least one resilient member and said moveable user input member.

6. The device of claim 5 wherein said second layer of dampening material is supported by an upper surface of said at least one resilient member.

7. The device of claim 4 wherein said first layer of dampening material rests on at least one of said input electrical contact and said interface electrical contact.

8. The device of claim 7 wherein said first layer of dampening material comprises a single-single piece of material that rests on both said input electrical contact and said interface electrical contact.

9. The device of claim 8 wherein said at least one input electrical contact comprises at least a pair of input electrical contacts positioned on opposing sides of said interface electrical contact, said single-piece of material resting on both of said input electrical contacts and said interface electrical contact.

10. The device of claim 8 wherein said first layer of dampening material comprises a plurality of discrete pieces of dampening material with one piece of dampening material resting on each of said input electrical contact and said interface electrical contact.

11. The device of claim 1 wherein said damper and at least one of said input electrical contact and said interface electrical contact are comprised of a single piece of dampening material.

12. The device of claim 1 wherein said at least one resilient member comprises a metal dome and wherein said damper comprises a first layer of dampening material positioned between a lower surface of said metal dome and said input and interface electrical contacts, and a second layer of dampening material positioned between an upper surface of said metal dome and said moveable user input member.

13. The device of claim 12 wherein said first layer of dampening material is defined by a first diameter and said second layer of dampening material is defined by a second diameter that is less than said first diameter.

14. A computer pointing device comprising:
   a moveable input that generates a user input signal that is communicated to a computer;
   an interface for communicating user input from said movable input to a computer, said interface including at least one interface electrical contact;
   at least one resilient member responsive to movement of said moveable input to electrically connect and disconnect at least one input electrical contact with said at least one interface electrical contact; and
   a damper assembly that dampens noise generated by movement of said moveable input in response to user input, said damper assembling including a first dampening mechanism associated with at least one of said input and said interface electrical contacts and a second dampening mechanism positioned between said at least one resilient member and said moveable input.

15. The device of claim 14 wherein said second dampening mechanism comprises a layer of dampening material that is supported by an upper surface of said at least one resilient member.

16. The device of claim 14 wherein said first dampening mechanism comprises a layer of dampening material that rests on an upper surface of at least one of said input electrical contact and said interface electrical contact.

17. The device of claim 16 wherein said layer of dampening material comprises a single-single piece of material that rests on both said input electrical contact and said interface electrical contact.

18. The device of claim 17 wherein said at least one input electrical contact comprises at least a pair of input electrical contacts positioned on opposing sides of said interface electrical contact, said single-piece of material resting on both of said input electrical contacts and said interface electrical contact.

19. The device of claim 16 wherein said layer of dampening material comprises a plurality of discrete pieces of dampening material with one piece of dampening material resting on each of said input electrical contact and said interface electrical contact.

20. The device of claim 14 wherein said first dampening mechanism and at least one of said input electrical contact and said interface electrical contact are comprised of a single piece of dampening material.

\* \* \* \* \*